(12) United States Patent
Suzuki et al.

(10) Patent No.: US 8,104,508 B2
(45) Date of Patent: Jan. 31, 2012

(54) VALVE DEVICE ASSEMBLING STRUCTURE, PLUG BODY, AND MANUAL VALVE

(75) Inventors: Takuya Suzuki, Anjo (JP); Hidetoshi Fujiwara, Nukata-gun (JP); Toshihiko Shima, Okazaki (JP); Munetoshi Kuroyanagi, Nukata-gun (JP); Tadayoshi Kamiya, Okazaki (JP); Soichi Shirai, Toyohashi (JP); Nobuyuki Shirai, Toyohashi (JP)

(73) Assignees: JTEKT Corporation, Osaka-shi (JP); Toyooki Kogyo Co., Ltd., Okazaki-shi (JP)

(*) Notice: Subject to any disclaimer, the term of this patent is extended or adjusted under 35 U.S.C. 154(b) by 1181 days.

(21) Appl. No.: 11/719,597

(22) PCT Filed: Nov. 10, 2005

(86) PCT No.: PCT/JP2005/020640
§ 371 (c)(1),
(2), (4) Date: May 17, 2007

(87) PCT Pub. No.: WO2006/054483
PCT Pub. Date: May 26, 2006

(65) Prior Publication Data
US 2009/0146094 A1   Jun. 11, 2009

(30) Foreign Application Priority Data

Nov. 17, 2004   (JP) ................................. 2004-332793

(51) Int. Cl.
*F16K 1/30* (2006.01)

(52) U.S. Cl. .............. 137/614.2; 137/614.21; 251/149.4
(58) Field of Classification Search .................. 137/322, 137/512, 613, 614.19, 614.2, 614.21; 251/149.4, 251/264, 274
See application file for complete search history.

(56) References Cited

U.S. PATENT DOCUMENTS
341,339 A * 5/1886 Linindoll ................... 251/149.4
(Continued)

FOREIGN PATENT DOCUMENTS
DE      2805040 A1    8/1979
(Continued)

OTHER PUBLICATIONS

Search Report issued Aug. 3, 2011 in European Patent Application No. 05806286.0.

*Primary Examiner* — Kevin Lee
*Assistant Examiner* — Craig J Price
(74) *Attorney, Agent, or Firm* — Oblon, Spivak, McClelland, Maier & Neustadt, L.L.P.

(57) ABSTRACT

A plug body housing 16 has a receiving recess 17, and the receiving recess 17 includes a first recess 21 opening toward the outside and a second recess 22 connected to the first recess 21. Check valves 8 and 9 are provided in the second recess 22, and a manual valve 14 is provided in the first recess 21. An internal threaded portion 45 is formed in an inner circumferential surface of the first recess 21, and a housing 35 of the manual valve 14 is threaded into the internal threaded portion 45. The check valves 8 and 9 are held between a bottom surface 22a of the second recess 22 and a bottom 35a of the housing 35 so that the check valves 8 and 9 are secured in the second recess 22.

6 Claims, 4 Drawing Sheets

U.S. PATENT DOCUMENTS

| | | | | |
|---|---|---|---|---|
| 1,372,915 | A * | 3/1921 | Smith | 137/614.2 |
| 1,662,291 | A * | 3/1928 | Bastian | 251/274 |
| 2,230,434 | A * | 2/1941 | Porter | 137/613 |
| 2,271,917 | A * | 2/1942 | Evleth | 251/149.4 |
| 2,283,970 | A * | 5/1942 | Buttner | 251/149.4 |
| 2,904,071 | A * | 9/1959 | Stein | 137/596 |
| 3,305,207 | A * | 2/1967 | Calderoni et al. | 251/86 |
| 3,359,995 | A * | 12/1967 | Parisi et al. | 137/539 |
| 3,958,599 | A * | 5/1976 | Sheldon et al. | 137/613 |
| 4,026,284 | A * | 5/1977 | Boehringer | 137/614.2 |
| 4,527,587 | A * | 7/1985 | Fairlamb | 137/614.19 |
| 4,676,271 | A * | 6/1987 | Fujikawa | 137/614.21 |
| 4,776,562 | A * | 10/1988 | Kalaskie et al. | 251/63.4 |
| 4,898,210 | A * | 2/1990 | Nitta | 137/614.19 |
| 4,945,945 | A * | 8/1990 | Schmid | 137/512 |
| 5,002,662 | A * | 3/1991 | Ledtje et al. | 137/512 |
| 5,048,565 | A | 9/1991 | Oi | |
| 5,176,175 | A * | 1/1993 | Farnham et al. | 137/614.2 |
| 6,196,523 | B1 * | 3/2001 | Miyata et al. | 251/276 |
| 6,230,737 | B1 | 5/2001 | Notaro et al. | |
| 6,626,204 | B2 * | 9/2003 | Oi et al. | 137/614.19 |
| 7,134,638 | B2 * | 11/2006 | Kamiya et al. | 251/144 |
| 2008/0105309 | A1 * | 5/2008 | Kuroyanagi et al. | 137/505.41 |

FOREIGN PATENT DOCUMENTS

| | | |
|---|---|---|
| DE | 3407116 A1 | 10/1984 |
| DE | 8518418 U1 | 10/1985 |
| DE | 4334182 A1 | 4/1995 |
| EP | 0 386 740 | 9/1990 |
| JP | 5-262214 | 10/1993 |
| JP | 9-210296 | 8/1997 |
| JP | 2833415 | 10/1998 |
| JP | 2000-074299 | 3/2000 |
| JP | 3143683 | 1/2001 |
| JP | 2001-304498 | 10/2001 |
| JP | 2003-130298 | 5/2003 |

\* cited by examiner

VALVE DEVICE ASSEMBLING STRUCTURE, PLUG BODY, AND MANUAL VALVE

FIELD OF THE INVENTION

The present invention relates to a structure for assembling plural valve devices to a plug body for plugging an opening in a gas tank for storing high pressure gas, a plug body having plural valve devices, and a manual valve assembled to a mounting body of the plug body and the like.

BACKGROUND OF THE INVENTION

Usually, in a plug body for plugging an opening in a gas tank, plural passages for communicating between the inside and outside of the gas tank are formed, and plural valve devices are also assembled such as a manual valve for shutting off the flow of high pressure gas within the passages or a check valve for preventing adverse flow of the gas (see, for example, Japanese Patent Laid-open Publication No. 09-210296).

In recent years, a gas tank for hydrogen mounted on a fuel cell vehicle or the like have tended to be designed so that hydrogen can be stored at higher pressure to increase the amount of stored hydrogen. Moreover, the number of valves assembled to the plug body for the gas tank has also tended to increase to achieve higher reliability for higher pressure of the stored hydrogen, or for high precision capability in regulating the pressure. For example, although the manual valve or check valve provided in a filling passage through which hydrogen passes for filling the gas tank, an additional check valve is preferably introduced to provide multiple valves for system redundancy to achieve reliability for the stored hydrogen at higher pressure. However, the increase in the number of valve devices assembled to the plug body makes the plug body larger, and assembly of the valve device complicated.

SUMMARY OF THE INVENTION

It is an objective of the present invention to provide an assembling structure capable of assembling plural valve devices to a plug body in a compact shape and in an easy way, and also to provide a plug body having such an assembling structure. It is another objective of the present invention to provide a manual valve capable of assembling plural articles to be assembled including the manual valve to a mounting body in a compact shape and in an easy way.

To achieve the above objectives, the present invention provides an assembling structure for assembling plural valve devices to a plug body for plugging an opening in a gas tank for storing high pressure gas. The plug body has a plug body housing including a receiving recess which opens toward the outside. An internal threaded portion is formed in an inner circumferential surface of the receiving recess. The plural valve devices include at least a first valve device and a second valve device. The first valve device is a manual valve which is threaded into the internal threaded portion so as to be operable from outside the plug body housing. The manual valve presses the second valve device to secure the second valve device in the receiving recess.

The present invention also provides a plug body for plugging an opening of a gas tank for storing high pressure gas. The plug body includes a housing having a receiving recess which opens toward the outside. An internal threaded portion is formed in an inner circumferential surface of the receiving recess. The plug body further includes a manual valve threaded into the internal threaded portion so as to be operable from outside the housing, and a valve device secured in the receiving recess in a state where the valve device is pressed by the manual valve.

The present invention further provides a manual valve assembled in a receiving recess formed in a predetermined mounting body. The manual valve includes a cylindrical housing having a passage therein, a valve body movably accommodated in the housing, and an operating screw for operating the valve body. The housing has a bottom at an end thereof and an opening at another end thereof. A valve seat is formed at the bottom so that the valve body can abut against the valve seat. The operating screw is threaded into the opening of the housing so as to abut against the valve body. The operating screw axially moves to cause the valve body to move toward or away from the valve seat as the operating screw is rotationally operated. An external threaded portion is formed in an outer circumferential surface of the housing. The housing is threaded into the receiving recess so that the bottom presses a predetermined article to be assembled, thereby securing the article to be assembled in the receiving recess.

DETAILED DESCRIPTION OF THE PREFERRED EMBODIMENTS

A gas tank 1 for hydrogen according to a first embodiment of the present invention will now be described below with reference to the drawings.

Figure 1:
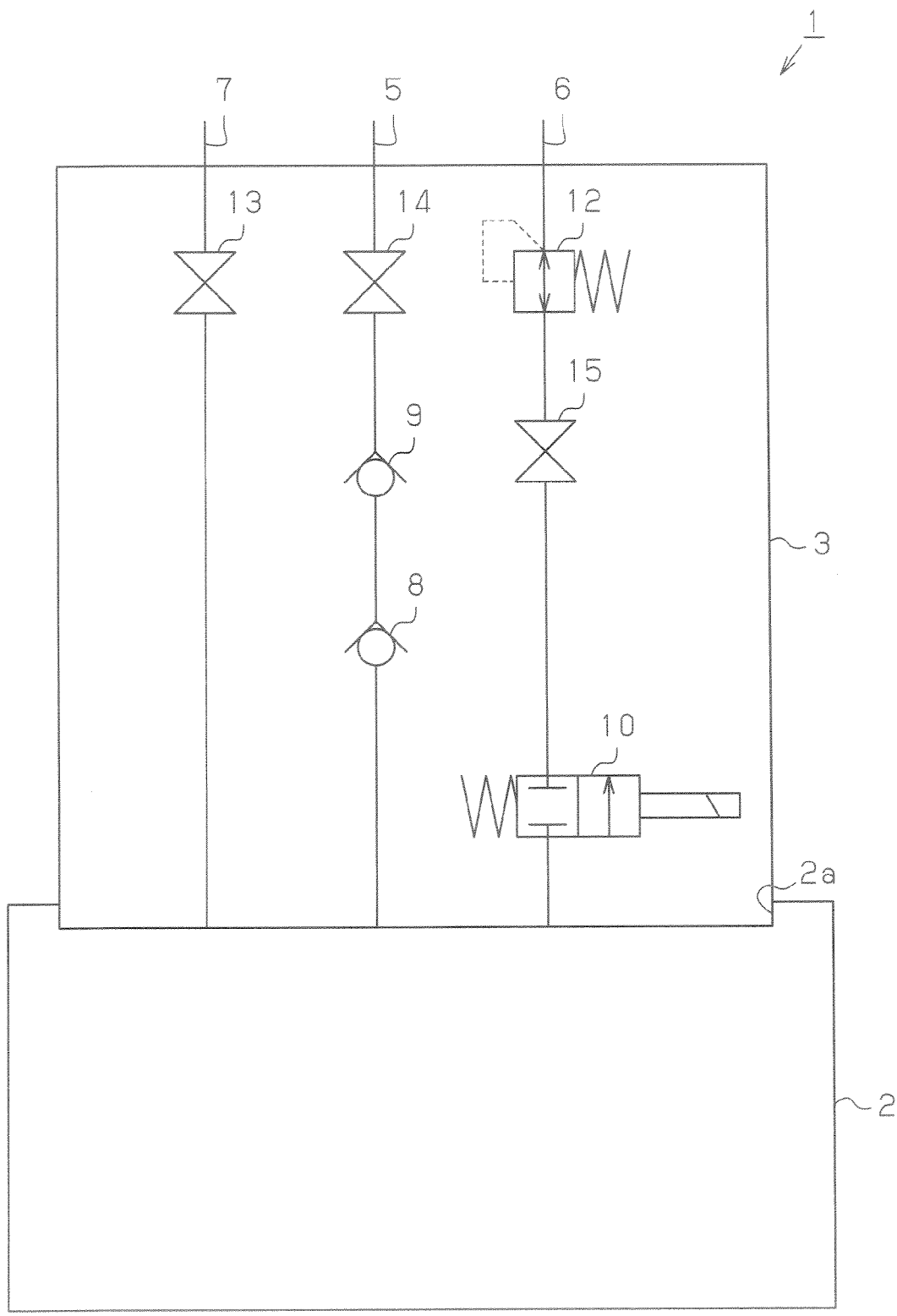
FIG. 1 is a schematic diagram of a flow circuit of a gas tank according to a first embodiment of the present invention.

As shown in FIG. 1, the gas tank 1 in this embodiment includes the tank body 2 for storing hydrogen gas, and the plug body 3 for plugging the opening 2a in the tank body 2. The plug body 3 includes plural passages 5, 6, and 7 for communicating between the inside and outside of the tank body 2 and plural valve devices 8, 9, 10, 12, 13, 14, and 15 for controlling the flow of hydrogen gas in the passages 5, 6, and 7.

The passages 5, 6, and 7 include a filling passage 5 allowing hydrogen gas to pass through for filling the gas tank 1, a supplying passage 6 allowing hydrogen to pass through for supply from the gas tank 1 to external equipment, and a discharging passage 7 allowing hydrogen gas to pass through for emission toward the outside from the gas tank 1.

The plural valve devices 8, 9, 10, 12, 13, 14, and 15 include two check valves 8 and 9, an electromagnetic on-off valve 10, a pressure reducing valve 12, and manual valves 13, 14, and 15. The check valves 8 and 9 are disposed in the filling passage 5 to prevent an adverse flow of hydrogen gas from the gas tank 1 to the outside thereof. The electromagnetic on-off valve 10 and pressure reducing valve 12 are disposed in the supplying passage 6. The manual valves 13, 14, and 15 are disposed in the respective passages 5, 6, and 7 for manual operation for shutting off the flow of hydrogen gas within the corresponding passages 5, 6, and 7.

Figure 2:
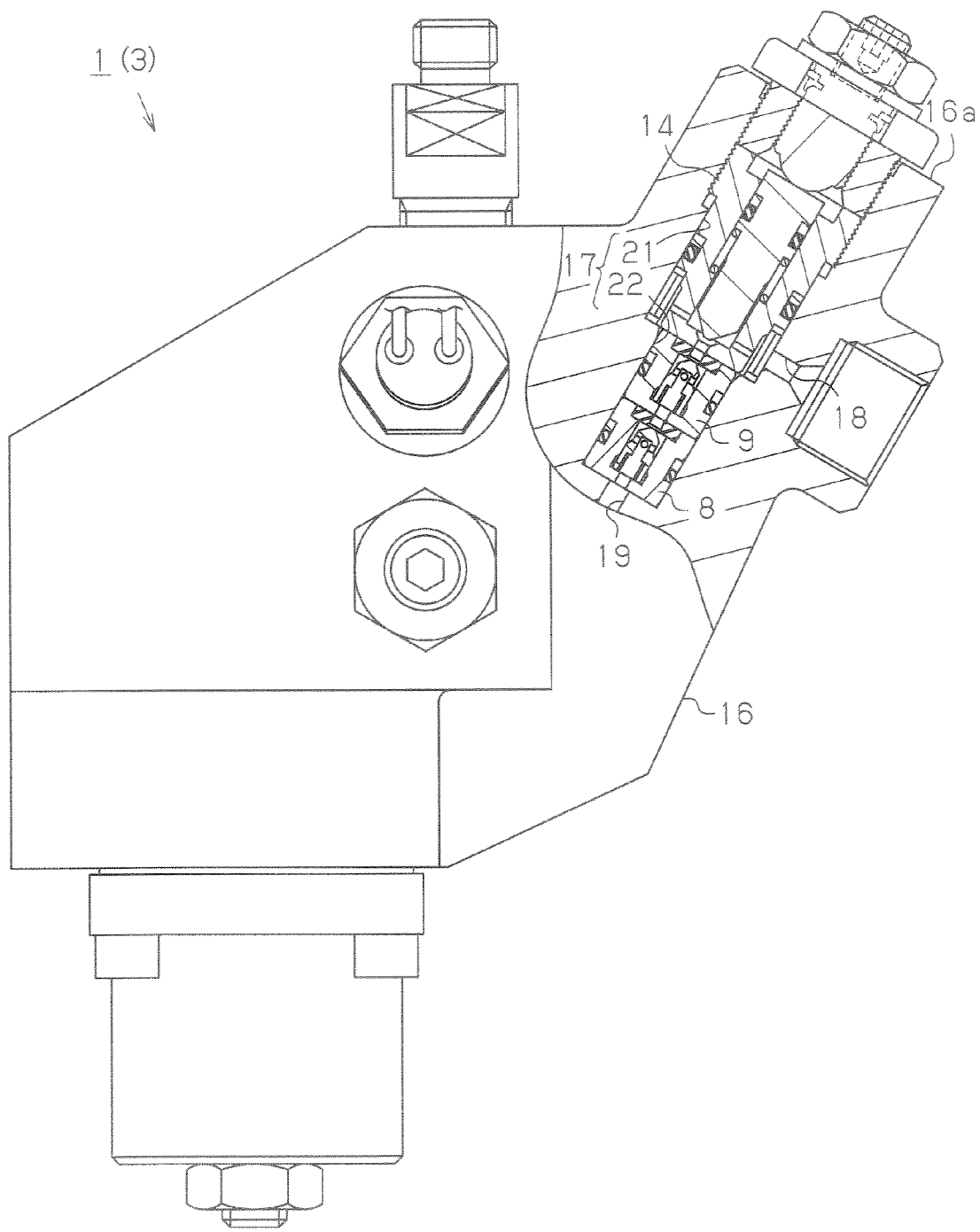
FIG. 2 is a partial cross-sectional view of a plug body in the gas tank of FIG. 1.

As shown in FIG. 2, the plug body 3 includes the housing (the plug body housing) 16, and the housing 16 includes the receiving recess 17 which opens on an outside surface 16a of the housing 16. The housing 16 also has a first passage 18 and second passage 19 collectively forming the filling passage 5, and the passages 18 and 19 communicate with the receiving recess 17. The first passage 18 allows the receiving recess 17 to communicate with the outside of the gas tank 1, and the second passage 19 allows the receiving recess 17 to communicate with the inside of the gas tank 1. The check valves 8 and 9 and manual valve 14 are secured to the housing 16 with themselves settled in the receiving recess 17.

Figure 3:
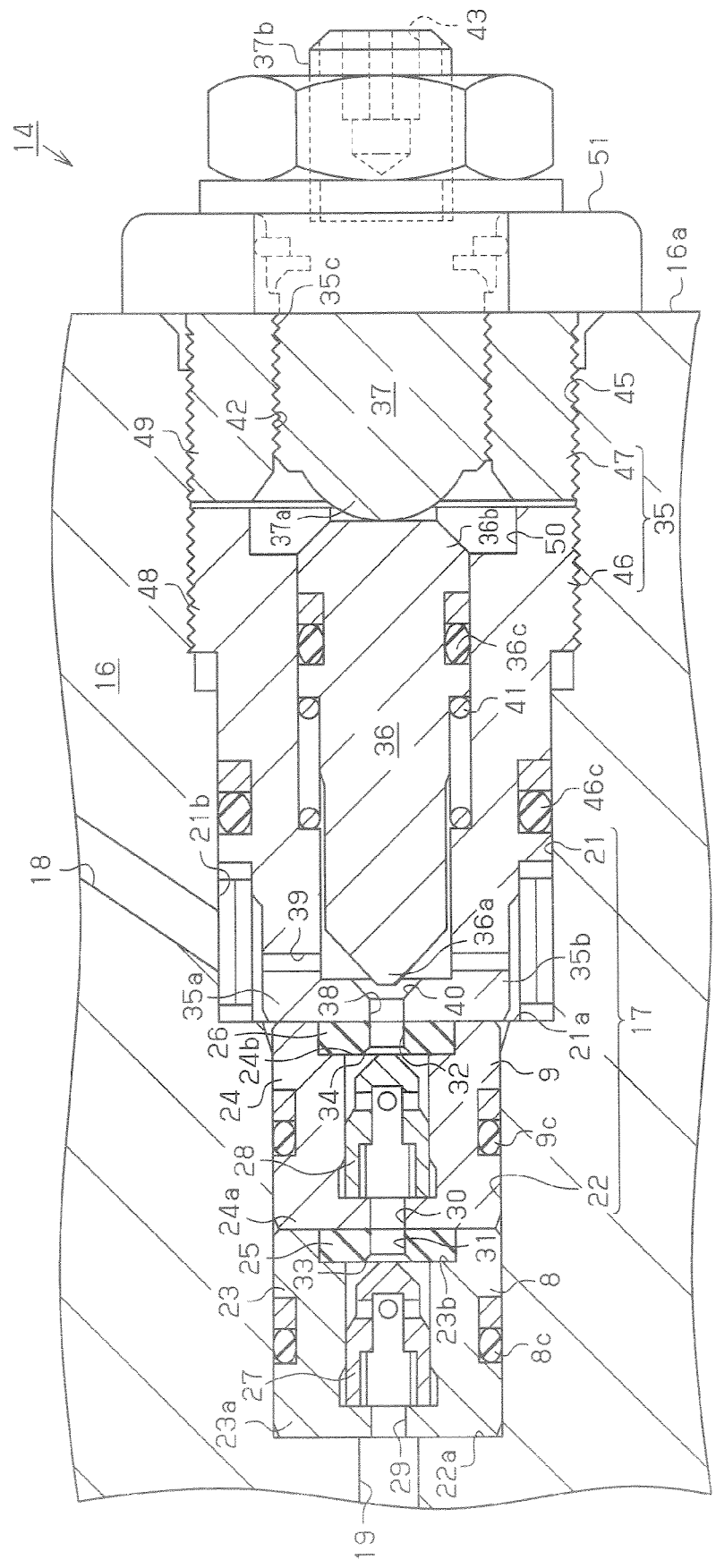
FIG. 3 is a cross-sectional view showing a securing structure for plural valve devices provided in the plug body of FIG. 2.

More specifically, as shown in FIG. 3, the receiving recess 17 includes a first recess 21 which opens on the outside surface 16a of the housing 16, and a second recess 22 which is connected to the first recess 21. The first recess 21 is larger than the second recess 22 in the diameters thereof, and a step 21a is formed between the recesses 21 and 22. The step 21a corresponds to the bottom surface of the first recess 21. The first passage 18 opens on the side surface (the circumferential surface, 21b of the first recess 21 near the step 21a, in other words, near the bottom surface 21a of the first recess 21. The second passage 19 opens on the bottom surface 22a of the second recess 22. The check valves 8 and 9 are disposed within the second recess 22, and the manual valve 14 is disposed within the first recess 21. The manual valve 14 corresponds to the first valve device, and check valves 8 and 9 correspond to the second valve device.

The check valves 8 and 9 respectively include cylindrical housings (check valve housings) 23 and 24 having bottoms 23a and 24a at respective ends thereof, lid bodies 25 and 26 plugging openings of the housings 23 and 24, and valve bodies 27 and 28 which are movably accommodated within the housings 23 and 24 in the axial directions thereof.

Through holes 29 and 30 are defined at the bottoms 23a and 24a of the housings 23 and 24, and through holes 31 and 32 are defined in the lid bodies 25 and 26. The through holes 29 to 32 let the inside and outside of the corresponding housings 23 and 24 communicate with each other. The through holes 29 to 32 are further provided so as to be coaxial with the valve bodies 27 and 28 settled within the corresponding housings 23 and 24. The lid bodies 25 and 26 serve as valve seats 33 and 34, which the corresponding valves 27 and 28 move toward and away from at the peripheries of the openings of the through holes 31 and 32.

The check valves 8 and 9 are disposed within the second recess 22 so that the bottoms 23a and 24a of the housings 23 and 24 face the second passage 19. More specifically, the first check valve 8 is disposed within the second recess 22 so that the bottom 23a thereof abuts the bottom surface 22a of the second recess 22. The second check valve 9 is disposed within the second recess 22 so that the bottom 24a thereof abuts the lid body 25 of the first check valve 8. Sealing rings (O-rings) 8c and 9c as sealing members are respectively fitted on the external circumferences of the check valves 8 and 9. In a state where the check valves 8 and 9 are disposed within the second recess 22, the second passage 19 communicates with the through hole 29 of the first check valve 8, and the through hole 31 of the first check valve 8 communicates with the through hole 30 of the second check valve 9. The valve bodies 27 and 28 are biased in toward the direction of sitting against the valve seats 33 and 34 by gas pressure in the tank body 2 to prevent the adverse flow of hydrogen in the filling passage 5.

The manual valve 14 includes a cylindrical housing (a manual valve housing) 35 having a bottom 35a on an end thereof, a valve body 36 slidably held within the housing 35 in an axial direction thereof, and an operating screw 37 for operating the valve body 35. The housing 35 is disposed within the first recess 21 so that the bottom 35a abuts the lid body 26 of the second check valve 9. In the bottom 35a of the housing 35, a through hole 38 is defined which communicates with the through hole 32 of the second check valve 9. A through hole 39 in communication with the first passage 18 is defined in a side wall (a circumferential wall) 35b of the housing 35 near the bottom 35a. Sealing rings (O-rings) 36c as a sealing member is fitted on the external circumferences of the valve body 36. The through hole 39, an inside space of the housing 35, and the through hole 38 form a passage allowing the first passage 18 to communicate with the through hole 32 of the second check valve 9.

Hydrogen gas introduced from an external supply source of hydrogen (not shown) to the first passage 18 flows into the inside of the housing 35 of the manual valve 14 through the through hole 39. Then, hydrogen gas within the housing 35 flows into the second passage 19 from the through hole 38 defined in the bottom 35a of the housing 35 through the check valves 8 and 9 to be filled within the tank body 2.

The bottom 35a of the housing 35 serves as a valve seat 40, which the valve body 36 moves toward and away from at the peripheries of the openings of the through holes 38. The valve body 36 is biased by elastic force from a valve spring 41 in a direction away from the valve seat 40, that is, in a direction toward the opening 35c of the housing 35.

By forming threads in the inner circumferential surface near the opening 35c of the housing 35, an internal threaded portion 42 is formed. The operating screw 37 is threaded to the internal threaded portion 42 with the proximal end 37b exposed to the outside of the housing 16 of the plug body 3. A hexagonal hole 43 is defined in the proximal end 37b of the operating screw 37. The operating screw 37 rotationally moves in an axial direction thereof when the screw 37 is operated to rotate with a predetermined tool engaging the hexagonal hole 43. A proximal end 36b of the valve body 36 abuts a distal end 37a of the operating screw 37 in a state of being biased by the valve spring 41. In this embodiment, since the distal end 37a of the operating screw 37 is a projecting hemispheroid, the distal end 37a of the operating screw 37 contacts the proximal end 36b of the valve 36 in a point-wise manner.

When the operating screw 37 is operated to rotate, the valve body 36 moves together with the operating screw 37 in the axial direction thereof, and thereby the distal end 36a of the valve body 36 moves toward and away from the valve seat 40. When the operating screw 37 is rotationally operated to move toward the housing 35 to be sunk within the housing 35, and finally the distal end 36a of the valve body 36 sits on the valve seat 40, the through hole 38 in communication with the inside of the housing 35 with the second check valve 9 is plugged, resulting in shutting off the flow of hydrogen gas in the filling passage 5.

The above described valve devices 8, 9, and 14, specifically the check valves 8 and 9 and manual valve 14, are assembled and mounted in the housing 16 of the plug body 3 as described below.

By forming threads in the inner circumferential surface near the opening of the first recess 21, an internal threaded portion 45 is formed. The manual valve 14 is secured on the housing 16 in the first recess 21 by the housing 35 thereof being threaded into the internal threaded portion 45. The check valves 8 and 9 are arranged in series in the second recess 22 and held between the bottom surface 22a of the second recess 22 and the bottom 35a of the housing 35. Due to the above, the check valves 8 and 9 are secured to the housing 16.

More specifically, the housing 35 of the manual valve 14 is composed by a first plug 46 having the bottom 35a and a second plug 47 to which the operating screw 37 is threaded. Screw threads are threaded on outer circumferential surfaces of the first plug 46 and second plug 47, forming external threaded portions 48 and 49. The valve body 36 is settled within the first plug 46. The first plug 46 and second plug 47 are respectively secured to the housing 16 of the plug body 3 in the first recess 21, due to a configuration where the external threaded portions 48 and 49 are threaded into the internal threaded portion 45 of the first recess 21. A sealing ring (an O-ring) 46c as a sealing member is fitted on the outer circumferential surfaces of the first plug 46.

When the valve devices 8, 9, and 14 are mounted on the housing 16 of the plug body 3, at first, the first and second check valves 8 and 9 are fitted into the second recess 22. Consecutively, the first plug 46 is threaded into the internal threaded portion 45 to be fixed in the first recess 21. Then, the check valves 8 and 9 are held between the bottom 35a of the first plug 4 and the bottom surface 22a of the second recess 22, and thereby the check valves 8 and 9 are secured within the second recess 22 with a predetermined tightening force.

In addition, in this embodiment, the lid bodies 25 and 26 of the check valves 8 and 9 are respectively made of an elastic material such as polyimid resin, and mounted on mounting recesses 23b and 24b provided in openings of the housings 23 and 24 of the check valves 8 and 9. The Lid bodies 25 and 26 are forced against the bottom 24a of the second check valve 9 or the bottom 35a of the first plug 46 accompanying plastic deformation by tightening force from the first plug 46 to exert a preferable sealing property.

After the check valves 8 and 9 are secured in the housing 16 by the first plug 46, the second plug 47 is threaded into the internal threaded portion 45 to be secure in the first recess 21. The second plug 47 is threaded into the internal threaded portion 45 so that a small gap between the second plug 47 and first plug 46 is defined.

A hexagonal hole 50 is defined at the opening-side end of the first plug 46. At the outer end of the second plug 47, a flange 51 is provided on the external circumference which is hexagonal. The first plug 46 is rotated by a predetermined tool engaging the hexagonal hole 50 to be threaded on the internal threaded portion 45 of the first recess 21. The second plug 47 is rotated by a predetermined tool engaging the flange 51 to be threaded on the internal threaded portion 45 of the first recess 21.

A second embodiment of the present invention in which the present invention is realized will now be described below with reference to the drawings. The same reference numerals are given to the same portion as in the first embodiment, and descriptions therefor are omitted.

Figure 4:
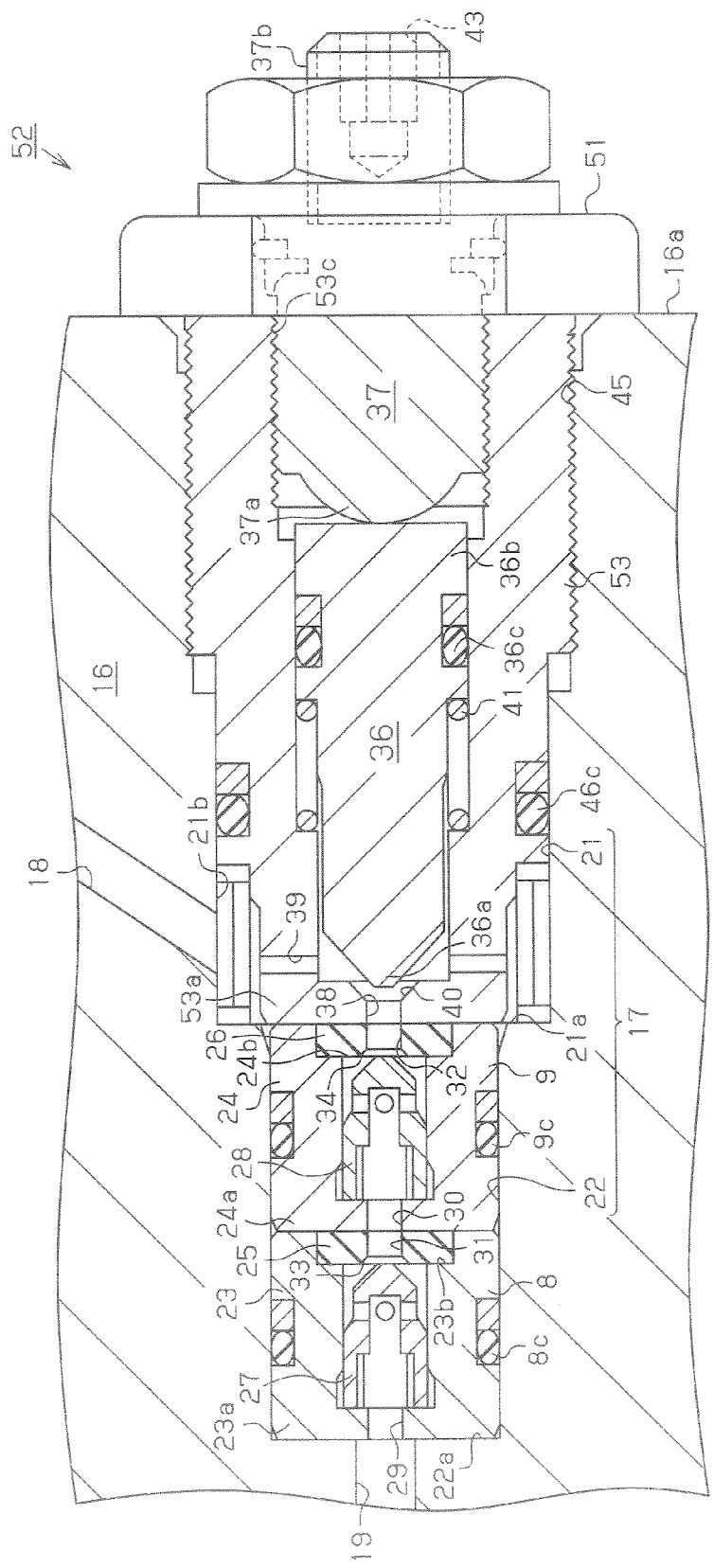
FIG. 4 is a cross-sectional view showing a securing structure for a valve device according to a second embodiment of the present invention.

With regard to the manual valve 14 in the first embodiment, the housing 35 is formed with the first plug 46 and second plug 47 which are separated from each other. Contrastingly, a manual valve 52 in this embodiment includes a single housing 53 as shown in FIG. 4. The housing 53 has a bottom 53a at an end thereof pressing the check valves 8 and 9 and an opening 53c at another end thereof in which the operating screw 37 is threaded. Due to a configuration where the housing 53 is threaded into the internal threaded portion 45 of the first recess 21, the check valves 8 and 9 are secured in the second recess 22.

Advantages that each embodiment achieves are described below.

(1) The housing 16 of the plug 3 includes the receiving recess 17, and the receiving recess 17 includes the first recess 21 opening in the outside surface 16a and the second recess 22 connected to the first recess 21. The second recess 22 is provided with the check valves 8 and 9, and the first recess 21 with the manual valve 14 (52). The manual valve 14 (52) is secured in the first recess 21 by the configuration where the housing 35 (53) of the manual valve 14 (52) is threaded into the internal threaded portion 45 of the first recess 21. The check valves 8 and 9 are held between the bottom surface 22a of the second recess 22 and the bottom 35a (53a) of the housing 35 (53) to be secured in the second recess 22.

More specifically, the manual valve 14 (52) includes the operating screw 37 exposed outside the gas tank 1 for external operation. In order to allow the operating screw 37 to be externally exposed, the receiving recess 17 of the plug body 3 on which the manual valve 14 (52) is mounted should inevitably be opened toward the outside. Accordingly, after the check valves 8 and 9 are inserted through the opening into the receiving recess 17, then the manual valve 14 (52) is threaded into the receiving recess 17, resulting in holding the check valves 8 and 9 between the receiving recess 17 and manual valve 14 (52) to be secured. In such a way, three valve devices, which are the check valves 8 and 9 and manual valve 14 (52) can be collectively mounted on the single receiving recess 17 to achieve a reduction in mounting space for plural valve devices. Moreover, the check valves 8 and 9 are inserted one by one from outside of the housing 16 of the plug 3 into the second recess 22, then the manual valve 14 (52) is screwed into the first recess 21, resulting in a completed assembly, and therefore, assembly is easy.

(2) In the first embodiment, the housing 35 of the manual valve 14 is formed by the first plug 46 having the bottom 35a pressing the check valves 8 and 9, and the second plug 47 on which the operating screw 37 is screwed. These plugs, the first plug 46 and second plug 47, are individually threaded in the first recess 21.

More specifically, the manual valve 14 (52) is constituted so that the manual valve 14 (52) secures the check valves 8 and 9 in the second recess 22 by a fastening force of the housing 35 (53) screwed in the first recess 21, and moves the valve body 36 toward and away from the valve seat 40 by the operation to rotate the operating screw 37 screwed to the housing 35 (53). When the operating screw 37 is operated to rotate, the housing 35 may possibly rotate together with the operating screw 37.

With regard to this matter, the manual valve 14 in the first embodiment includes separate bodies which are the first plug 46 having the bottom 35a pressing the check valve 8 and 9, and the second plug 47 in which the operating screw 37 is screwed, then the first and second plugs 46 and 47 are individually screwed into the first recess 21. Therefore, even if the second plug 47 rotates coincident with the operating screw 37 when the operating screw 37 is rotationally operated, the first plug 46 does not rotate. Accordingly, a pressing force (a clamping force) to secure the check valves 8 and 9 can be maintained at the most preferable value at all times. Moreover, since tightening torque for the second plug 47 does not affect the pressing force to secure the check valves 8 and 9, the second plug 47 is further firmly tightened to prevent coincident rotation. In the first embodiment, the second plug 47 can be firmly tightened by a way where the flange 51 formed in the second plug 47 is pressed to firmly contact with the outside surface 16a of the housing of the plug 3.

In a case where the pressure of the filling gas is extremely high such as a gas tank for hydrogen, the valve body 36 is forced to press against the operating screw 37 by the gaseous pressure. The force created by the pressing causes force for rotating the operating screw 37 to increase, and tends to make coincident rotation happen. In addition, in this embodiment, the tightening force of the housing 35 causes the lid bodies 25 and 26 of the check valves 8 and 9 to elastically deform, thereby exerting a preferable sealing property with the lid bodies 25 and 16. Accordingly, the housing 35 of the manual valve 14 is configured with the individual members which are the first plug 46 and second plug 47, and thereby the configuration is useful in preventing coincident rotation and in enhancing sealing properties.

In the second embodiment, torque for operably rotating the operating screw 37 is preferably set lower than the tightening torque of the housing 53 in order to prevent breakage of the check valves 8 and 9 caused by excess tightening force due to such coincident rotation or deterioration of sealing properties caused by insufficient tightening force.

It should be noted that each embodiment described above may be modified as below.

Although the present invention has been applied to a hydrogen gas tank in the embodiments above, the present invention may be applied to a high pressure gas tank other than a gas tank for hydrogen, or to a structure for assembling plural articles to be assembled including a manual valve for a mounting body.

In the embodiments described above, the present invention is realized by an assembling structure for the check valves 8 and 9 and manual valve 14 (52) disposed in the filling passage, but the present invention may be realized by an assembling structure for a valve device disposed in another passage. In other words, a valve device secured by the manual valve may be other than a check valve.

Although the tightening force of the housing 35 (53) is configured to make the lid bodies 25 and 26 of the check valves 8 and 9 elastically deform to exert preferable sealing properties with the lid bodies 25 and 26 in the embodiments described above, a configuration is possible in which a valve device is simply secured.

Although the valve body 36 is settled in the first plug 46 in the first embodiment, the first plug 46 and second plug 47 are configured so that at least part of the valve body 36 may be settled in the second plug 47.

The invention claimed is:

1. An assembling structure for use with a gas tank for storing high pressure gas in which the gas tank includes an opening, the assembling structure comprising:
   a plug body mounted to the gas tank for plugging the opening in the gas tank, wherein the plug body has a plug body housing including a receiving recess which opens toward the outside, a first passage communicating the receiving recess with the outside of the gas tank, a second passage communicating the receiving recess with the inside of the gas tank, and an internal threaded portion formed in an inner circumferential surface of the receiving recess; and
   plural valve devices including at least a first valve device and a second valve device fluidically connected in series to selectively open and close fluid communication between the first passage and the second passage, such that high pressure gas entering or exiting the gas tank must traverse both said first valve device and said second valve device, wherein the first valve device is a manual valve which is threaded into the internal threaded portion so as to be operable from outside the plug body housing, and the manual valve presses the second valve device to secure the second valve device in the receiving recess,
   and wherein the second valve device is a one way valve held between a bottom surface of the receiving recess and the manual valve and configured to permit high pressure gas, having passed through the first valve device, to pass the second valve device and enter the second passage, and configured to prevent high pressure gas in the second passage from passing the second valve device.

2. The assembling structure according to claim 1, wherein each of the first and second valve devices has a valve hole and a valve body for closing the valve hole.

3. An assembling structure for use with a gas tank for storing high pressure gas in which the gas tank includes an opening, the assembling structure comprising a plurality of valve devices and a plug body for plugging the opening in the gas tank, wherein the plug body has a plug body housing including a receiving recess which opens toward the outside, an internal threaded portion is formed in an inner circumferential surface of the receiving recess, the plural valve devices include at least a first valve device and a second valve device, the first valve device is a manual valve which is threaded into the internal threaded portion so as to be operable from outside the plug body housing, and the manual valve presses the second valve device to secure the second valve device in the receiving recess,
   wherein the manual valve includes a cylindrical manual valve housing having a passage for high pressure gas, a valve body movably accommodated in the manual valve housing, and an operating screw for operating the valve body, the manual valve housing has a bottom at an end thereof and an opening at another end thereof, a valve seat is formed at the bottom so that the valve body can abut against the valve seat, the operating screw is threaded into the opening of the manual valve housing so as to abut against the valve body, and the operating screw axially moves to cause the valve body to move toward or away from the valve seat as the operating screw is rotationally operated, and
   wherein an external threaded portion is formed in an outer circumferential surface of the manual valve housing, and the external threaded portion is threaded to the internal threaded portion, so that the bottom presses the second valve device, thereby securing the second valve device in the receiving recess,
   wherein the manual valve housing includes a first plug having the bottom and a second plug to which the operating screw is threaded, and the first plug and the second plug are formed separately from each other.

4. An assembling structure for use with a gas tank for storing high pressure gas in which the gas tank includes an opening, the assembling structure comprising:
   a plug body mounted to the gas tank for plugging the opening in the gas tank, wherein the plug body has a plug body housing including a receiving recess which opens toward the outside, a first passage communicating the receiving recess with the outside of the gas tank, a second passage communicating the receiving recess with the inside of the gas tank, and an internal threaded portion formed in an inner circumferential surface of the receiving recess; and
   plural valve devices including at least a first valve device and a second valve device fluidically connected in series to selectively open and close fluid communication between the first passage and the second passage, such that high pressure gas entering or exiting the gas tank must traverse both said first valve device and said second valve device, wherein the first valve device is a manual valve which is threaded into the internal threaded portion so as to be operable from outside the plug body housing, and the manual valve presses the second valve device to secure the second valve device in the receiving recess, wherein the second valve device is a check valve, the check valve includes a check valve housing having a bottom at an end thereof and an opening at another end, a valve body movably accommodated in the check valve housing, and a lid body attached to the opening of the check valve housing, a valve seat is formed in the lid body so that the valve body can abut against the valve seat, and the valve body is biased in a direction to sit on the valve seat by gas pressure in the gas tank, and wherein the lid body is formed of an elastic material so as to be elastically deformed when pressed by the manual valve threaded into the internal threaded portion.

5. A plug body for plugging an opening of a gas tank for storing high pressure gas, the plug body comprising:

a housing mounted to the gas tank and having a receiving recess which opens toward the outside, with an internal threaded portion being formed in an inner circumferential surface of the receiving recess;

a manual valve threaded into the internal threaded portion so as to be operable from outside the housing; and a valve device secured in the receiving recess in a state where the valve device is pressed by the manual valve, wherein the manual valve and the valve device are fluidically connected in series to selectively open and close fluid communication between the gas tank and an exterior of the gas tank, such that high pressure gas entering or exiting the gas tank must traverse both said manual valve and said valve device, and wherein said valve device is a one way valve held between a bottom surface of the receiving recess and the manual valve and configured to permit high pressure gas, having passed through said manual valve, to pass said valve device and enter the gas tank, and configured to prevent high pressure gas in the gas tank from passing said valve device.

6. The plug body according to claim 5, wherein each of the manual valve and the valve device has a valve hole and a valve body for closing the valve hole.

* * * * *